Figure 1:
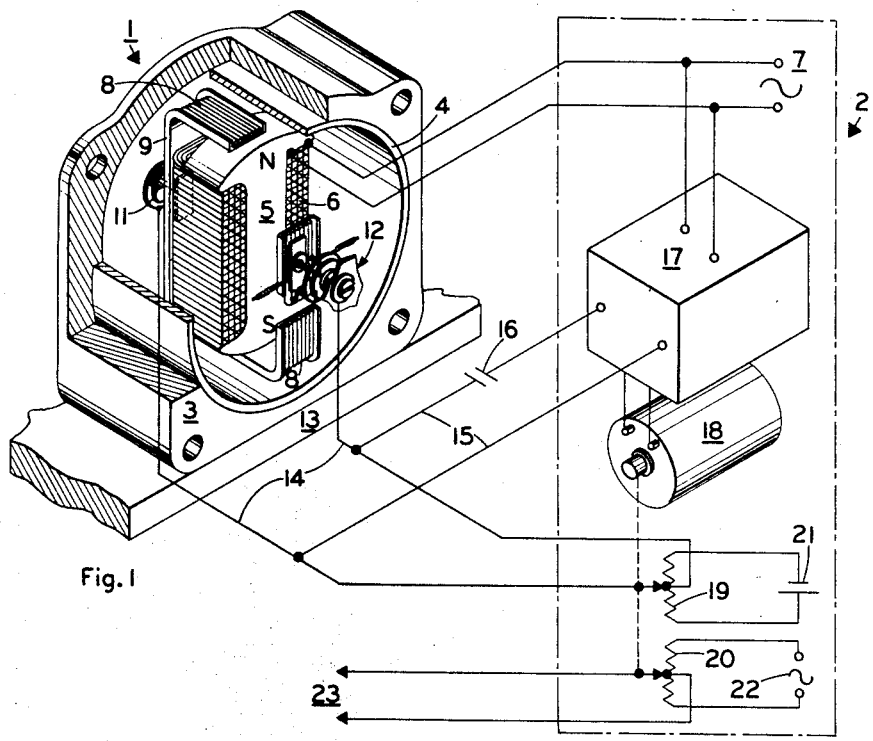

July 26, 1960 H. C. WENDT ET AL 2,946,226
ACCELEROMETERS
Filed Sept. 17, 1957

Inventors:
Harry C. Wendt
Clarence A. Haskell
by Richard E. Hosley
Their Attorney United States Patent Office 2,946,226
Patented July 26, 1960

2,946,226
ACCELEROMETERS

Harry C. Wendt, Lynnfield Center, and Clarence A. Haskell, Marblehead, Mass., assignors to General Electric Company, a corporation of New York Filed Sept. 17, 1957, Ser. No. 684,607

6 Claims. (Cl. 73—517)

This invention relates to accelerometers and methods of detecting accelerations and more particularly to acceleration sensitive instruments in which electromagnetic forces balance acceleration forces applied to a sensing element, the electrical currents which produce the electromagnetic forces thus becoming a measure of acceleration.

For many years there has been a great need for accelerometers with a high degree of sensitivity, a wide range of acceleration response, and a size small enough to qualify for mounting on high precision inertially stabilized platforms. These requirements are mutually conflicting and have been very difficult to achieve in a single unit. Recourse has therefore been taken to arrangements in which the acceleration detector is separated from other parts of the measuring system. The detector portion may then be positioned on a stabilized platform with the remainder of the system remotely located. Size, sensitivity, and range of response are still critical factors, however, and it is a general object of this invention to provide an acceleration sensitive instrument in which the acceleration detector is extremely compact without sacrificing either range or sensitivity.

It is a further and more specific object of this invention to provide an accelerometer in which the primary acceleration detector combines the functions of a pickoff and torque device in the same moving element.

Still another object of the invention is to provide an improved method of detecting accelerations permitting the employment of extremely compact sensing means.

By way of a summary account of but one embodiment of this invention, an acceleration detector is provided in the form of an elongated magnetically polarized core structure surrounded about its pole pieces by a cylindrical element of permeable material defining a flux return path. A solenoid wound about the core structure is excited by alternating currents to superpose a geometrically coincident alternating magnetic field on the unidirectional field set up by the core. In an air gap between the pole pieces and the cylindrical element, a deflectable winding is mounted to be displaced by acceleration forces from a normal position in which the net inductive coupling between it and the alternating field component is zero to positions having varying degrees of coupling varying with displacement. Deflection of the winding due to acceleration causes an alternating current signal to be induced in the winding. A remotely positioned amplifier connected to receive the alternating current signal governs a motor driving the movable contact of a potentiometer across which a direct current potential is impressed. The direct current potential derived from the movable contact is applied directly across the deflectable winding in the acceleration detector causing it to set up a unidirectional magnetic field reacting with the unidirectional field supplied by the core structure. The direction of the direct currents in the deflectable winding is chosen to urge the winding back toward its normal position, until a condition of balance is reached between the deflecting acceleration force on the one hand and the restoring electromagnetic force on the other hand. Simultaneously, another potentiometer is governed by the same motor to produce a signal related in amplitude to the acceleration under measurement. With such an instrument, the acceleration detector, combining, as it does, the properties of a pickoff and a torque motor, may be constructed very compactly and still maintain a high degree of sensitivity, as well as a wide range of usable response.

Figures 2, 3:
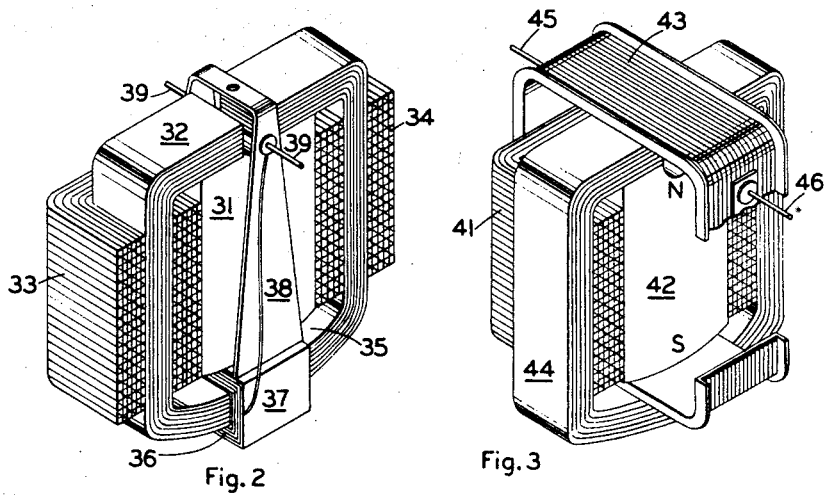

While the scope of this invention should not be limited, except by a fair interpretation of the appended claims, further details of the invention, as well as additional objects and advantages, may be better understood in connection with the accompanying drawings wherein:

Figure 1 represents in a partly schematic, partly pictorial view, an acceleration sensitive instrument constructed in accordance with these teachings; and Figures 2 and 3 represent alternative constructions of the primary detector portion of the instrument according to this disclosure.

In Figure 1 there is depicted an acceleration sensitive instrument in which the primary detector 1 is mounted separately and positioned remotely from control equipment 2 which includes the functions of telemetering and supply equipment. The primary detector includes a support structure 3 containing a cylindrical flux conducting element 4 which may be formed of some suitable low reluctance material such as soft iron. Mounted centrally thereof is a stationary magnetic core 5 having a solenoidal excitation winding 6 surrounding it. The purpose of the magnetic core 5 is to produce in the air gap adjacent its pole pieces a combined unidirectional and alternating magnetic field. To create the unidirectional component of the magnetic field, either the core may be permanently magnetized or a direct current excitation signal may be circulated in a separate excitation winding or in at least a portion of the excitation winding 6. For the purposes of this discussion it will be assumed that the core is formed of a permanently magnetized material. The excitation winding is excited by an alternating current signal from source 7 and a magnetic field is thereby created in the air gap adjacent the pole pieces of the core 5, which field combines geometrically coincident unidirectional and alternating components. A deflectable winding 8 is provided on a coil form 9 suspended on pivotal bearings 11 and 12. Electrical contact may be made by means of flexible conducting spirals to the winding 8.

If the acceleration detector is to be used for sensing angular accelerations, it will be desirable to have windings 8 perfectly balanced about their pivot points. The inertia of the winding 8 and its coil form 9 will then permit it to be deflectable in response to angular accelerations about the axis through pivots 11 and 12. On the other hand, if the accelerometer is to be used for detecting linear accelerations, some mass eccentricity should be provided on the coil form 9. The winding 8 will then be deflectable in response to acceleration components in some direction perpendicular to the axis through pivots 11 and 12. If the mass unbalance is provided at the lower portion of the deflectable winding as seen in Figure 1, the sensitive axis will be parallel to the base 13.

In operation a magnetic field combining unidirectional and alternating components will circulate through core 5 and through the flux return path defined by cylindrical member 4. Normally, that is under conditions of zero acceleration, the winding 8 occupies a position of zero mutual inductance with respect to the combined magnetic fields since it is positioned at a point where the fields separate into equal halves circulating in opposite directions. Acceleration in a direction to which the instrument is sensitive will immediately cause a deflection of the winding 8, resulting in its becoming inductively coupled with portions of the alternating magnetic field set up in the air gap. A net periodically varying potential will thereby be induced in the winding which is taken off through conductors 14 and 15 and supplied through a blocking condenser 16 to a discriminator amplifier 17. For illustrative purposes, the amplifier 17, operated from supply source 7, is shown with its output leads connected to operate a reversible servo motor 18. Consequently, the movable contacts of a pair of potentiometers 19 and 20 are driven by the reversible motor 17 with the following effects. Movement of the movable contact on potentiometer 19, across which a direct current supply 21 is connected, in either directon from its center-tapped position will cause a direct current of one polarity or another to flow in the deflectable winding 8. As a result, the field set up by winding 8 will react with the unidirectional component of the field produced by core 5. Direction of current flow is chosen such that the reacting unidirectional fields urge the deflectable winding 8 back toward its normal position of zero mutual inductance. Soon a condition is reached in which the restoring electromagnetic torque exactly balances the torque applied to the deflectable winding by the acceleration under measurement; when this condition is reached, the direct current excitation of the deflectable winding is a measure of the acceleration. Although the direct current signal supplied to the deflectable winding could be used directly to provide an indication of the acceleration under measurement, it is not necessary that it be so used. In the preferred embodiment shown a phase-characterized alternating current signal is derived instead from a center-tapped potentiometer 20 controlled simultaneously with the control of potentiometer 19 and supplied at terminals 22 from an alternating current source. The output signals produced at terminals 23 may then be used in any of several methods not important to this invention to control an indicator or system responsive to accelerations.

With the instrument just described, it will be noted that the functions of a pickoff and a torque motor have been combined in a single movable element, the deflectable inductive winding 8. By means of this invention, therefore, the detector portion of the accelerometer may be made extremely compact without sacrificing sensitivity. Furthermore, the balance provided by the restoring electromagnetic torque has the effect of returning the movable element to a nearly constant position and very large accelerations may be measured with but a small deflection of the deflectable winding. The instrument, therefore, combines the further advantages of a very wide range of response with its previously mentioned advantages.

In the preferred form of the invention shown in Figure 1, the winding 8 was selected as the movable element of the detector because of its comparatively small mass. Such an arrangement requires but a small restoring torque and the power requirements imposed upon the direct current source are correspondingly small. Inspection will reveal, however, that the winding 8 could be made stationary and the core 5 suspended for deflection by acceleration-imposed forces. This alternative might be resorted to in some cases, but all other things being equal, it would impose greater power requirements on the system. Fundamentally, however, the signal winding 8 should be subjected both to a unidirectional field and an alternating magnetic field with some relative movement being permitted between the winding and the field producing element in response to acceleration forces. An obvious alternative to the control equipment identified by numeral 2 would be to provide a discriminator amplifier whose output itself is in the form of a controlled polarity direct current and to feed back the output of the amplifier directly to the deflectable winding without recourse to electromechanical arrangements. It should be apparent therefore that the specific embodiments described herein are offered for illustrative purposes.

Figures 2 and 3 illustrate alternative constructions of the detector portion of the instrument which are primarily useful for the detection of linear, as opposed to angular, accelerations. Figure 2 shows a core structure formed in two sections, including a central flux path 31 which may or may not be permanently magnetized and a laminated portion 32. The excitation winding for supplying the alternating current to produce the alternating magnetic field and possibly direct current also is wound in two sections 33 and 34 connected in series opposition about separate branches of the laminated core. The unidirectional and alternating magnetic fluxes therefore circulate through the central flux path 31 dividing normally along congruent paths to flow through opposite portions of the laminated portion 32 of the core, thereby creating in the air gap 35 both unidirectional and alternating magnetic fields. The deflectable winding 36, contained within a coil form 37 and suspended in turn from frame 38, encircles the lower portion of the core structure 32 at a normal position of zero mutual inductance with sufficient clearance between the core and coil to permit an acceleration-induced deflection to cause movement of the core to the right or left in the figure. The pivotal suspension permitting movement of the coil may comprise a pair of torsion wires 39 through which electrical contact may be made to the coil. The operation of the device is otherwise as described in connection with Figure 1.

In Figure 3 another form of the detector is shown utilizing a core structure identical to that shown in Figure 2. In this form, however, the excitation winding 41 encircles the central flux path 42 of the core structure. And the deflectable winding 43, instead of encircling the lower portion of the laminated core structure 44, is formed of larger dimensions encircling the central flux path of the core structure. As in Figure 2, current to the windings 43 is supplied through the pivotal suspension afforded by torsion wires 45 and 46.

In addition to the alternative forms of accelerometer instrument described herein, other variations, modifications, and substitutions within the scope of these teachings will doubtless occur to those skilled in the art to which this invention pertains. The examples depicted should therefore be taken as illustrative in nature and this disclosure should not necessarily be considered to be limited to the specific examples shown.

What we claim as new and desire to secure by Letters Patent of the United States is:

1. An acceleration sensitive instrument comprising: a core formed of magnetic material; means for producing in said core and in a region of space adjacent thereto a unidirectional magnetic field and an alternating magnetic field; an electrical coil in said region of space exposed to both said fields; means mounting said core and coil for relative movement in response to acceleration forces from a normal relative position of zero mutual inductance to positions of varying mutual inductance, whereby acceleration-induced relative displacements between said core and coil cause periodically varying potentials to be produced in said coil; means connected to receive said periodically varying potentials for producing a direct current signal related in magnitude to the amplitude of said periodically varying potentials; and means applying said direct current signal to said coil to create a magnetic field reacting with the aforesaid unidirectional magnetic field for urging said coil and core toward said normal relative position.

2. An acceleration sensitive instrument comprising: a magnetizable structure defining a magnetic circuit and including an air gap in said circuit; means for producing in said air gap a magnetic field having a unidirectional component and an alternating component; a winding deflectable by acceleration forces from a normal position of zero mutual inductance within said field to positions of varying mutual inductance, whereby acceleration-induced deflections of said winding cause periodically varying potentials to be produced in said winding; means connected to receive said periodically varying potentials for producing a direct current signal related in magnitude to the amplitude of said periodically varying potentials; and means applying said direct current signal to said winding to create a magnetic field reacting with the aforesaid unidirectional component for urging said winding toward said position of zero mutual inductance.

3. An acceleration sensitive instrument comprising: a magnetizable structure having an air gap; means for producing in said structure and air gap a magnetic field having geometrically coincident superposed unidirectional and alternating components; current conducting windings deflectable in said gap by acceleration forces, said windings normally occupying a position of zero mutual inductance within said field and being deflectable therefrom by acceleration forces to positions of varying mutual inductance, whereby acceleration-induced deflections of said windings cause periodically varying potentials to be produced in said windings; means connected to receive said periodically varying potentials for producing direct currents related in magnitude to the amplitude of said periodically varying potentials; and means applying said direct currents to said windings to create a magnetic field reacting with said unidirectional component for forcing said windings towards said position of zero mutual inductance.

4. An acceleration sensitive instrument comprising: a support structure; a permanent magnet supported by said supporting structure for producing a unidirectional magnetic field stationary with respect to said support structure; means for producing an alternating magnetic field superposed on said unidirectional magnetic field including a coil fixedly supported by said support structure; an electrical winding subject to both the unidirectional and alternating magnetic fields and pivotally supported by said support structure for acceleration-induced deflections from a normal position of zero mutual inductance with respect to said alternating magnetic field to positions of varying degrees of inductance depending upon the magnitude of the acceleration, whereby acceleration-induced deflections of said winding cause periodically varying potentials to be produced therein; means connected to receive said periodically varying potentials for producing a direct current signal related in magnitude to the amplitude of said periodically varying potentials; and means for applying said direct current signal to said winding to create a magnetic field reacting with said unidirectional field and urging said winding toward said position of zero mutual inductance.

5. An acceleration sensitive instrument comprising: a support structure; means for producing a unidirectional magnetic field stationary with respect to said support structure; means for producing a periodically varying magnetic field stationary with respect to said support structure; inductive means including electrically conductive means deflectable in said fields by acceleration forces from a normal position relative to said alternating field of zero mutual inductance to positions of varying mutual inductance, whereby acceleration-induced deflections of said conductive means cause periodically varying potentials to be produced in said inductive means; means connected to receive said periodically varying potentials for producing a direct current signal related in magnitude to the amplitude of said periodically varying potentials; and means for applying said direct current signal to said conductive means to create a magnetic field reacting with the aforesaid unidirectional magnetic field for urging said conductive means toward said position of zero mutual inductance.

6. An accelerometer comprising a frame, a permanent magnet fixedly supported by the frame and providing a unidirectional magnetic field, means including a coil fixedly supported by said frame and constructed and arranged to provide that when the coil is connected to a source of alternating current an alternating magnetic field will be superposed on said unidirectional magnetic field, and a second coil disposed in both the alternating and unidirectional magnetic fields in a position of zero mutual inductance with respect to said alternating magnetic field and being pivotally supported by said frame for movement relative thereto from said position of zero mutual inductance to positions of varying mutual inductance in response to acceleration of the frame in a predetermined direction, said second coil being connectible to a source of direct current related in magnitude to the amplitude of the periodically varying potentials induced therein in response to displacement thereof relative to the frame.

References Cited in the file of this patent

UNITED STATES PATENTS

| | | |
|---|---|---|
| 2,136,219 | Scherbatskoy | Nov. 8, 1938 |
| 2,591,921 | Cosgriff et al. | Apr. 8, 1952 |
| 2,697,594 | Stanton | Dec. 21, 1954 |

FOREIGN PATENTS

| | | |
|---|---|---|
| 759,585 | Great Britain | Oct. 24, 1956 |